United States Patent [19]

Münter

[11] 4,387,457

[45] Jun. 7, 1983

[54] DIGITAL CONFERENCE CIRCUIT AND METHOD

[75] Inventor: Ernst A. Münter, Kanata, Canada

[73] Assignee: Northern Telecom Limited, Montreal, Canada

[21] Appl. No.: 273,058

[22] Filed: Jun. 12, 1981

[51] Int. Cl.³ .................. H04M 3/56; H04Q 11/04
[52] U.S. Cl. ................................ 370/62; 179/18 BC
[58] Field of Search ............... 179/18 BC, 1 CN, 37; 370/62

[56] References Cited

U.S. PATENT DOCUMENTS

| | | | |
|---|---|---|---|
| 3,924,082 | 12/1975 | Oliver et al. | 179/18 BC |
| 3,970,797 | 7/1976 | Johnson et al. | 370/62 |
| 4,007,338 | 2/1977 | McLaughlin | 370/62 |
| 4,031,328 | 6/1977 | Pitroda | 370/62 |
| 4,190,744 | 2/1980 | Frank | 179/18 BC |
| 4,224,688 | 9/1980 | Ciancibello et al. | 370/62 |

Primary Examiner—Thomas A. Robinson
Attorney, Agent, or Firm—Robert C. Hogeboom

[57] ABSTRACT

A digital conference circuit for a digital telephone switching network is provided, connected between a receive TDM (time division multiplex) bus carrying PCM (pulse code modulation) words to the conference circuit and a transmit TDM bus carrying PCM words from the conference circuit. A memory (storage) device stores the PCM words most recently received on the receive TDM bus and decision circuitry determines, for each conferee, which two PCM words, excluding the PCM word originating from that conferee, should be read from the memory device. The two PCM words so read are attenuated in a predetermined fashion, summed, and the resultant PCM sum applied to the transmit TDM bus during an appropriate timeslot. The decision circuit makes its decision based upon the largest average magnitude of each conferee's PCM words, received at the conference circuit, during the previous frames. In other words, for transmission on the transmit TDM bus to a given conferee, two PCM words are chosen from amongst the other conferees based upon the largest average magnitude of those conferee's PCM words.

32 Claims, 11 Drawing Figures

FIG. 7a (SIX-PARTY CONFERENCE)

| | FRAME 1 | | | | | | FRAME 2 | | | | | | FRAME 3 | | | | | |
|---|---|---|---|---|---|---|---|---|---|---|---|---|---|---|---|---|---|---|
| SIGNALS ON RECEIVE TDM BUS 21 | A1 | B1 | C1 | D1 | E1 | F1 | A2 | B2 | C2 | D2 | E2 | F2 | A3 | B3 | C3 | D3 | E3 | F3 |
| SIGNALS ON TRANSMIT TDM BUS 38 | | B1+C1 | A1+C1 | | | | A2+B1 | A2+B2 | A2+B2 | A2+B2 | B2+C2 | A2+B2 | A2+C2 | A3+B2 | A3+B2 | A3+B3 | A3+B3 | A3+B3 |

FIG. 7b (TWO, THREE-PARTY CONFERENCE)

| | FRAME 1 | | | | | | FRAME 2 | | | | | | FRAME 3 | | | | | |
|---|---|---|---|---|---|---|---|---|---|---|---|---|---|---|---|---|---|---|
| SIGNALS ON RECEIVE TDM BUS 21 CONFERENCE #2 CONFERENCE #1 | A1 | B1 | C1 | D1 | E1 | F1 | A2 | B2 | C2 | D2 | E2 | F2 | A3 | B3 | C3 | D3 | E3 | F3 |
| SIGNALS ON TRANSMIT TDM BUS 38 | C1+E1 | D1+F1 | A2+E1 | B2+F1 | A2+C2 | B2+D2 | C2+E2 | D2+F2 | C2+E2 | D2+F2 | A3+E2 | B3+F2 | A3+C3 | B3+D3 |

DIGITAL CONFERENCE CIRCUIT AND METHOD

BACKGROUND OF THE INVENTION

This invention relates generally to telephone conferencing circuits, and more particularly to telephone conferencing circuits employing digital techniques and wherein each participant (conferee) receives the digital signals from the two loudest of all the other participants (conferees).

Conferencing circuits are well known in the field of telephony. In general terms, a conference circuit is a circuit for allowing three or more participants (or conferees) to talk to one another at the same time. Early conference circuits, employed in analogue telephone systems, provided conferencing by summing all the signals of all the participants and transmitting this resultant signal to all the conferees, with the exception of the talker who received the resultant signal minus his own signal. As telephone technology advanced into the world of digital techniques, simple summing and subtracting no longer provided an easy solution to the problem of conferencing.

Some prior art approaches to conferencing with digital techniques were simply to convert the digital signals to analogue signals, perform an analogue conferencing, and re-convert the resultant analogue conference signal into a digital signal. One example of such an approach is shown in U.S. Pat. No. 3,970,797 dated July 20, 1976 to D. A. Johnson and Wm. C. Towle. It is, however, cumbersome to conference in this manner if it is possible to conference directly in digital format. Additionally, the converting to analogue and reconverting to digital adds distortion to the signals involved.

An improvement over the analogue summing of signals for conferencing is to do the summing directly with digital signals. Since the digital signals are commonly not linear, but rather are non-linearly Pulse Code Modulated (PCM), it is necessary to first linearize the digital signals, add them, and then re-code (all the while remaining in the digital domain). U.S. Pat. No. 3,924,082 dated Dec. 2, 1975 to S. E. Oliver and N. R. Winch and U.S. Pat. No. 4,190,744 dated Feb. 26, 1980 to R. J. Frank describe two such systems.

A further modification in conferencing circuits is to provide a digital conferencing circuit which performs the conferencing function directly using the coded digital signals. U.S. Pat. No. 4,007,338 dated Feb. 8, 1977 to D. W. McLaughlin, U.S. Pat. No. 4,031,328 dated June 21, 1977 to S. G. Pitroda, and U.S. Pat. No. 4,224,688 dated Sept. 23, 1980 to C. A. Ciancibello and E. A. Munter, to mention just a few, all depict such a conferencing circuit. In circuits of this type each conferee receives the one PCM word judged the largest (i.e. loudest) from all the other conferees. As an example in a three party conference, two PCM words (corresponding to two time slots or channels) are compared and the largest PCM word is transmitted to the third channel.

SUMMARY OF THE INVENTION

In simplified terms, the present invention provides a conference circuit by monitoring the magnitude of the PCM words received from each conferee, and transmitting to each conferee, the "loudest" and the second "loudest" PCM words (i.e. the two "loudest" PCM words) from all the other conferees (i.e. from all the PCM words excluding the conferee's own PCM word). The choice of the two "loudest" PCM words is based upon calculated loudness codes which are derived from the absolute magnitudes of the PCM words in each conferee's time slot (or channel). In the preferred embodiment of the present invention, the approximate absolute magnitudes of the two "loudest" PCM words is also determined and a predetermined amount of attenuation (which may be zero) is inserted into the PCM samples prior to their transmission to the other conferees.

Some advantages of the present conference circuit are that it improves the interrupting capability of a conference connection. Since the present conference circuit transmits the PCM words from the two "loudest" conferees, when a first conferee is talking he can hear a second conferee attempting to interrupt him while the second conferee can still hear the first conferee, and while all the other conferees can hear both the first and second conferees. Another feature of the present invention is the capability of cascading conference circuits of the present invention since, when only one conferee is talking, his signal is not attenuated.

Stated in other terms the present invention is a conference circuit for connection in a digital telephone system between a first TDM (time division multiplex) bus for carrying, in N distinct time slots of each frame, PCM (pulse code modulation) words to the conference circuit, and a second TDM bus for carrying, in N distinct time slots of each frame, PCM words from the conference circuit, for establishing a conference connection between N-conferees, wherein N is a positive integer, $3 \leq N$, the conference circuit comprising: memory apparatus for storing the N PCM words received on the first TDM bus during the N time slots; circuitry for determining for each conferee, according to a predetermined criterion, which two PCM words stored in memory apparatus, excluding the PCM word originating from the conferee, meet the criterion; and circuitry for summing the two PCM words meeting the criterion and for applying the resultant PCM sum word to the second TDM bus.

Stated in yet other terms, the present invention is a conference circuit for connection in a digital telephone system between a first TDM (time division multiplex) bus for carrying, in N distinct time slots of each frame, PCM (pulse code multiplex) words to the conference circuit, and a second TDM bus for carrying, in N distinct time slots of each frame, PCM words from the conference circuit, for establishing a conference connection between N-conferees, wherein N is a positive integer, $3 \leq N$, the conference circuit comprising: memory apparatus, responsive to the PCM words on the first TDM bus, for storing the N PCM words received on the first TDM bus during the N time slots; code circuitry for forming and for storing N loudness codes, each loudness code being associated with one conferee and being derived from the absolute magnitude of the PCM words in that conferee's time slot on the first TDM bus; selection apparatus both for determing the two PCM words to be read from the memory apparatus, for each conferee, by determining according to a predetermined criterion, which two of the N loudness codes meet the criterion, and for reading from the memory apparatus, for each conferee, the two most recent PCM words corresponding to the two conferees associated with the two loudness codes indicated as meeting the criterion; and summation circuitry for adding together the two PCM words, so read by the selection apparatus, and producing a resultant PCM word on the second TDM bus during the time slot corresponding to the conferee.

Stated still in other terms, the present invention is a method of providing a conference circuit interconnection in a digital telephone system for N conferees, wherein N is a positive integer, $3 \leq N \leq 32$, and wherein the telephone system has a first TDM (time division multiplex) bus for carrying, in N distinct time slots of each frame, PCM (pulse code modulation) words to the conference circuit, and a second TDM bus for carrying, in N distinct time slots of each frame, PCM words from the conference circuit, the method comprising: storing the N PCM words received on the first TDM bus during the N time slots; determining for each conferee, according to a predetermined criterion, which two of the N most recently stored PCM words, excluding the PCM word originating from the conferee, meet the criterion; summing, for each conferee, the two PCM words that meet the criterion and outputting the resultant PCM sum on the second TDM bus.

BRIEF DESCRIPTION OF THE DRAWINGS

The invention will now be described in more detail with reference to the accompanying drawings, wherein like parts in each of the several figures are identified by the same reference character, and wherein:

FIG. 7a is a simplified diagrammatic representation depicting how PCM words are received and transmitted by the conference circuit of FIG. 1 in a six-party conference;

FIG. 7b is a simplified diagrammatic representation depicting how PCM words are received and transmitted by the conference circuit of FIG. 1 in two three-party conferences.

DETAILED DESCRIPTION

Figure 1:
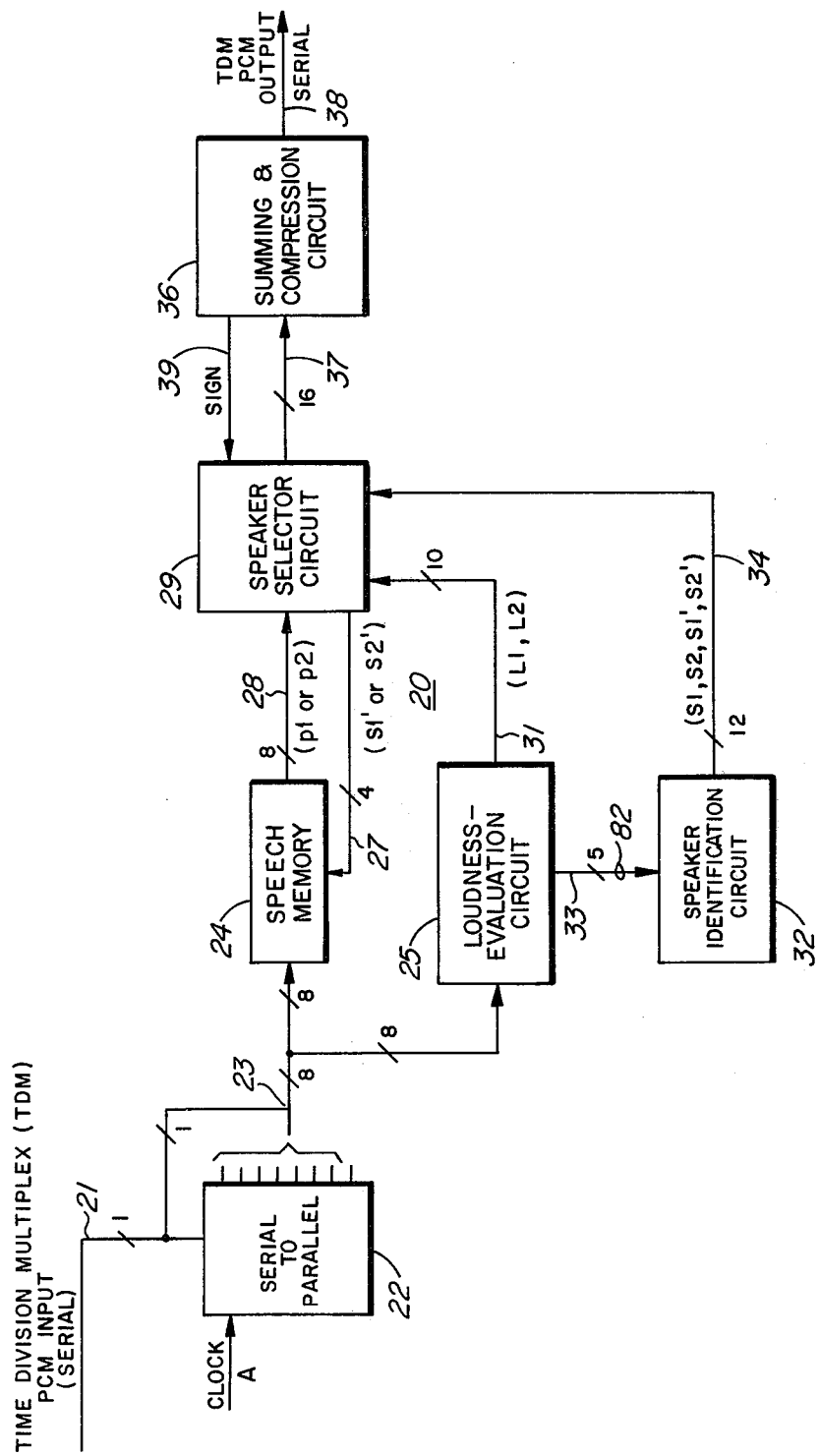
FIG. 1 is a simplified block diagram of the conference circuit of the present invention.

FIG. 1 is a simplified block diagram depicting an exemplary embodiment of the conference circuit 20 of the present invention, suitable for use with three to six conferees.

Serially received PCM (pulse code modulation) signals (up to six channels out of a potential of thirty-two available channels) are received on TDM (Time Division Multiplex) receive bus 21 and are converted into parallel form by serial-to-parallel converter 22 (e.g. a Texas Instruments 74LS164) and are output on bus 23.

The eight-bit parallel PCM word on bus 23 is applied both to speech memory 24 and to loudness evaluation circuit 25. Speech memory 24 contains a RAM (Random Access Memory) that can store six, 8-bit digital words; these stored digital words are the most recently received signals from each of the conferees connected to conference circuit 20. The relative read address (S1' or S2') is applied to speech memory 24 via address bus 27, and the eight-bit word (P1 or P2) read from speech memory 24 appears on data bus 28.

Figure 3:
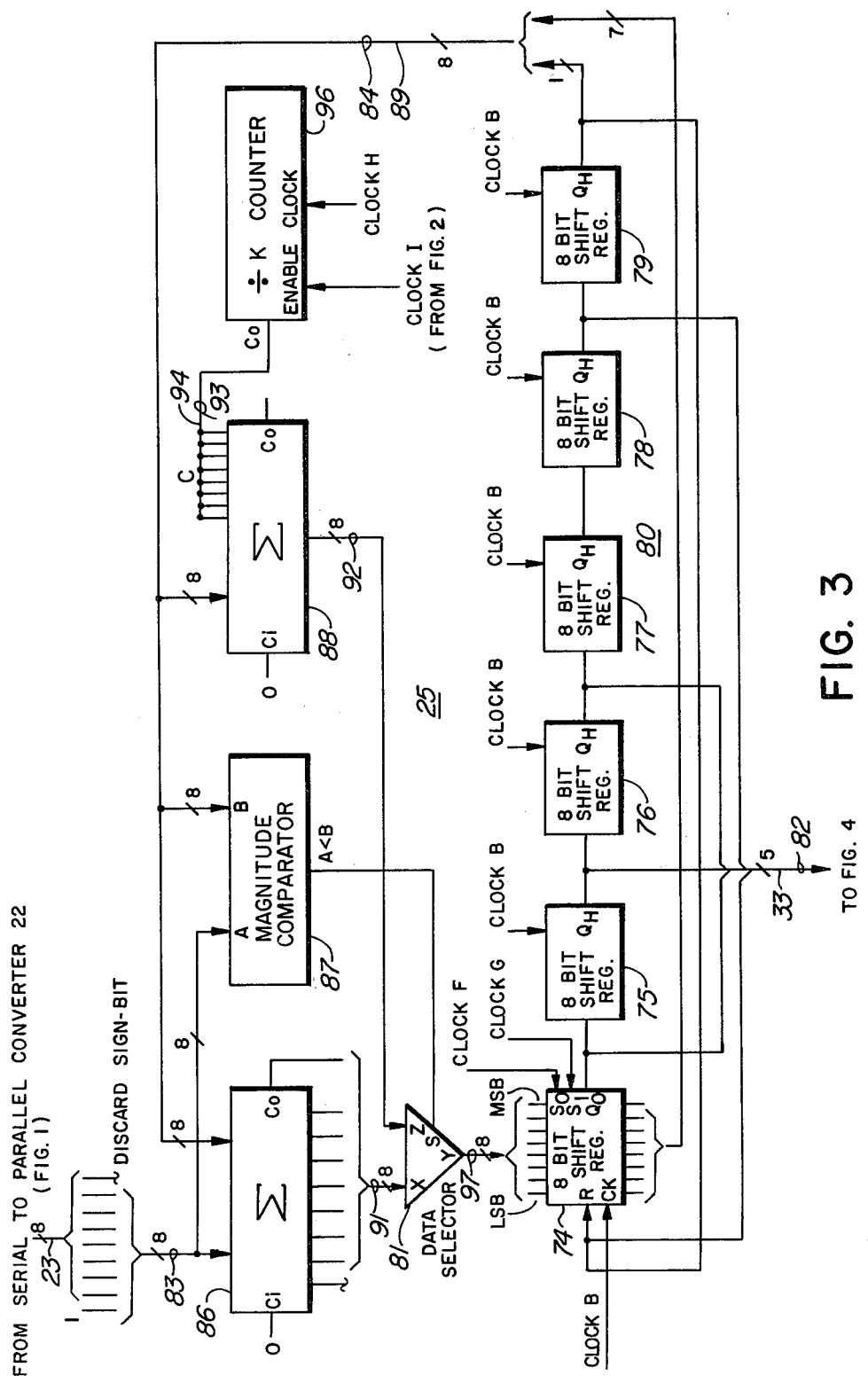
FIG. 3 is a simplified block diagram of the loudness evaluation circuit of FIG. 1.

Loudness evaluation circuit 25 contains a memory circuit comprising six 8-bit shift registers (described in more detail in FIG. 3). Ten taps are made to the shift registers and the signals from these taps are applied to speaker selector circuit 29, as loudness codes L1 and L2, via bus 31. Another set of five taps (referred to as data signal 82) provides signals to speaker identification circuit 32 via bus 33. Speaker identification circuit 32 produces four three-bit codes (S1, S1', S2, and S2') on bus 34 which are applied to speaker selector circuit 29 and which are indicative of which conferee will be a "speaker".

Speaker selector circuit 29 forwards the relative address (S1' or S2') of the selected speaker sample (stored in memory 24) to memory 24 via address bus 27 and receives back from memory 24, the addressed speech sample (i.e. PCM word) on data bus 28.

Speaker selector circuit 29 also linearizes the coded PCM signals received on bus 28 from the selected conferee ("speaker") and inserts a certain amount of loss (which may be zero loss). This sixteen-bit linear PCM signal is applied to summing and compression circuit 36 via bus 37. Circuit 36 sums the linearized PCM signals from the loudest and second loudest speakers and then compresses the resultant summation into a coded PCM signal and transmits it, in serial form, on bus 38.

Figure 2:
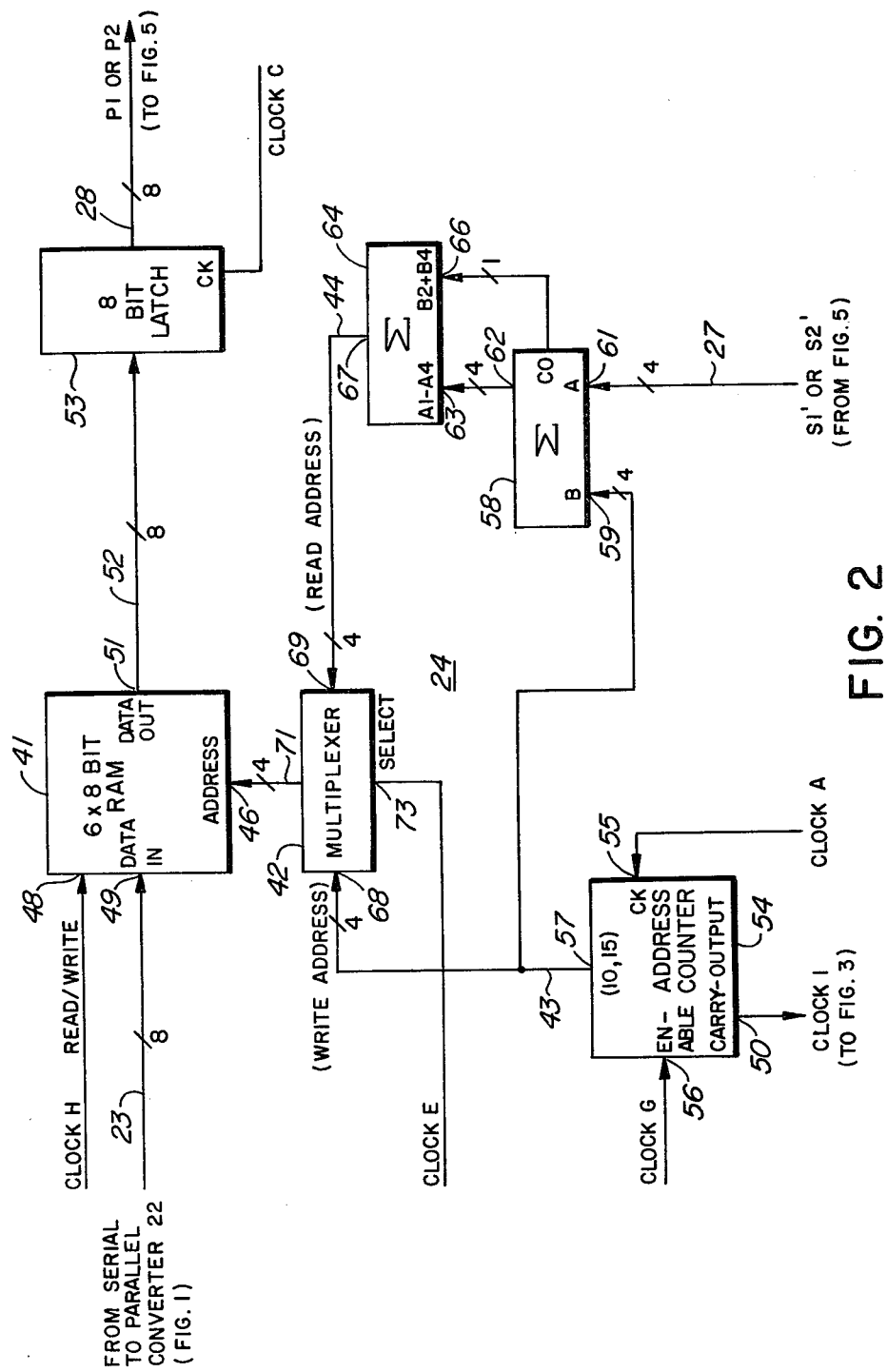
FIG. 2 is a simplified block diagram of the speech memory of FIG. 1.

FIG. 2 is a simplified block diagram depicting the construction of speech memory 24 in more detail. The constituents of speech memory 24 are interconnected as depicted in FIG. 2, and attention is directed thereto.

RAM (Random Access Memory) 41 stores six 8-bit PCM words received on bus 23 from serial-to-parallel converter 22 (FIG. 1). RAM 41 is comprised of two Texas Instruments (TI) model SN74LS189 which are 64 bit memories organized as 16 words of 4 bits each; the two model SN74LS189's together provide a memory capacity of 16 words (8 bits each), of which only six words are actually employed in this particular application of RAM 41.

Multiplexer 42 (e.g. a TI model SN74LS257) applies either a four bit write address (from bus 43) or a four-bit read address (from bus 44) to the address input 46 of RAM 41. A read (logic 1) or write (logic 0) signal (clock H) is applied to input 48 of RAM 41. The data to be stored (from bus 23) is applied to data input 49 of RAM 41 and the data read from RAM 41 appears at data output 51 and is applied to eight-bit latch 53 (e.g. two T.I. model SN74LS175) via bus 52. The output of latch 53 on bus 28, is the PCM word from the chosen "speaker", i.e. the PCM word from either the "loudest" or the second "loudest" conferee, chosen *not* globally, but from the point of view of each "listener".

Counter 54 (e.g. a TI model SN74LS163) is a four-bit binary counter, which counts the number of clock pulses (Clock A) appearing at its clock input 55 (when enabled by clock G) and producing, at its output 57, a count incremented by one, after each clock pulse. Note that for the present application the counter is preset to begin counting at ten, and it counts from ten to fifteen and then returns to ten and continues in this cycle.

The output of counter 54, from output terminal 57, is applied both to multiplexer 42 and to four-bit binary adder 58 (e.g. TI model SN74LS283) via bus 43. Input 59 of adder 58 receives the signal from bus 43 and input 61 of adder 58 receives a signal S1' or S2' on bus 27 (to be described in greater detail, later, with reference to FIGS. 4 and 5) which is representative of the relative address of a selected "speaker". The output of adder 58, from output terminal 62, is applied to input terminals 63 of adder 64 (e.g. TI model SN74LS283). The other input terminals (terminals 66) of adder 64 receive the carry output signal from adder 58. The connection to terminals 66 is made such that a carry output signal (i.e. a logic 1) results in the addition of ten to the count applied to terminal 63; this is accomplished by choosing as terminals 66 terminals B2 and B4 of TI model SN74LS283; i.e. the most significant input representing the power of $2^3$ and the second least significant input representing the power $2^1$. The output of adder 64, on output terminal 67, is applied to the remaining input of multiplexer 42 (i.e. input 69) via bus 44. Note that adder 58 and adder 64 together form a "modulo 6" adder, offset from zero by a constant ten; i.e. the input code at input 59 (ranging from ten to fifteen) is added to the input code at input 61 (ranging from zero to five) to result in an output code at bus 44 (ranging from ten to fifteen) This is illustrated in the table below.

|  |  | Input Code at Input 59 |  |  |  |  |  |
|---|---|---|---|---|---|---|---|
|  |  | 10 | 11 | 12 | 13 | 14 | 15 |
| Input Code at Input 61 | 0 | 10 | 11 | 12 | 13 | 14 | 15 |
|  | 1 | 11 | 12 | 13 | 14 | 15 | 10 |
|  | 2 | 12 | 13 | 14 | 15 | 10 | 11 |
|  | 3 | 13 | 14 | 15 | 10 | 11 | 12 |
|  | 4 | 14 | 15 | 10 | 11 | 12 | 13 |
|  | 5 | 15 | 10 | 11 | 12 | 13 | 14 |
|  |  | Output Code at Terminal 67 |  |  |  |  |  |

Multiplexer 42 selects either the address applied to its input 68 or its input 69 to be produced on its output 71, and thus employed to address RAM 41. The selection of input 68 or input 69 is made by clock signal E applied to select input 73 of multiplexer 42, with the address on bus 43 being selected for writing into RAM 41 and the address on bus 44 being selected for reading from RAM 41.

FIG. 3 depicts, in simplified block form, loudness evaluation circuit 25. Shift registers 74, 75, 76, 77, 78 and 79, referred to collectively as memory 80, are connected in series as shown in FIG. 3. Shift register 74 (e.g. two TI model SN74LS194A) is fed parallely from data selector 81, and serially from the output of shift register 79. Shift registers 75, 76, 77, 78 and 79 (e.g. TI model SN74LS164) are each fed serially as shown in FIG. 3. The taps shown at the inputs to registers 74, 75, 76, 77, and 79 are to provide data signal 82 to speaker identification circuit 32 (see FIG. 4) via bus 33.

The seven last significant bits from shift register 74, signal 84 are applied to adder 86, magnitude comparator 87 and adder 88 via bus 89. Note that the loudness code words, stored in memory 80, are shifted from shift register 74 to shift register 75, and so on, with the most significant bit of each word being the first bit to be shifted to the next register, followed by the second most significant, etc.

Adder 86 (two TI model SN74LS283) sums the absolute value of the PCM word received from serial-to-parallel converter 22 (FIG. 1), via bus 23, augmented by the addition of a least-significant logic 1 bit (referred to as signal 83), with signal 84 on bus 89. The seven most significant bits output from adder 86, along with the carry out bit (in the most significant bit position), referred to as signal 91, are applied to one data input of data selector 81. The other data input of selector 81 receives signal 92, the output of adder 88.

The input to adder 88 comprises signal 84 and signal 93, on line 94, from counter 96. Counter 96 (two TI SN74LS163) is a divide by K counter (K=16) which produces one logic 1 signal on its Co output, for every K pulses of clock I applied to the enable input of counter 96. Note that clock I is a pulse that occurs every time address counter 54 reaches a count of fifteen. The purpose of signal 93 is to provide a substract one signal to adder 88, not for every frame, but at a lower rate.

Magnitude comparator 87 (two TI model SN74LS85) monitors the magnitude of signal 83 applied to its A input and the magnitude of signal 84 applied to its B input. If the magnitude on input A, of comparator 87, is less than the magnitude on input B, of comparator 87, then the A<B output of comparator 87 is a logic 1; otherwise it is a logic 0. Thus, the data at output terminal Y of data selector 81 is as follows:

| For signal 83 ≧ signal 84, | Y equals the average of signals 83 and 84. |
|---|---|
|  | i.e. $\frac{\text{signal } 83 + \text{signal } 84}{2}$ |
| For signal 83 < signal 84, | Y equals signal 84 if the carry output, Co, of counter 96, is a logic 0. If Co is a logic 1, then Y equals signal 84 minus one. |

The output signal 97 on terminal Y of selector 81 is applied to shift register 74 in parallel format.

Shift registers 74, 75, 76, 77, 78 and 79 form a memory 80 which is shifted eight times during each channel timeslot. The output of the last register 79 is the input to the first register 74, so that, in the absence of updating (via signal 97), the same codes circulate exactly once per frame period (i.e. once every 125 microseconds). When the code for a particular channel is to be updated, this occurs "on the fly" with the last clock pulse of that channel timeslot (i.e. when clock G goes high), by parallel loading of shift register 74. Updating occurs in every channel timeslot, even if the new value of the loudness code turns out to be the same as the old value (e.g. signal 83 equals signal 84).

Each shift register in memory 80 stores an eight-bit loudness code indicative of the magnitude of the previously received PCM words from each conferee. These loudness codes are being continually shifted through memory 80 so that, at appropriate times, shift register 74 contains the loudness code for one conferee, shift register 75 contains the loudness code for another conferee, and so on with shift registers 76, 77, 78 and 79. During other time periods, one particular loudness code will be contained partially by one shift register in memory 80, and partially by another shift register in memory 80.

The eight-bit loudness code for each conferee (stored in memory 80) is based upon the absolute magnitude (seven-bits) of the received PCM word for that conferee augmented by a least-significant one-bit. This loudness code is increased if the received signal 83 exceeds the stored value (i.e. signal 83 is greater than signal 84 at comparator 87). It is decreased only if the received signal 83 is less than the stored value (i.e. signal 84) and if counter 96 provides an enable output (i.e. if the carry output Co of counter 96 is a logic 1). Counter 96 functions to slow down the decrementing of the stored code value by enabling a decrement only once every Kth frame (in the preferred embodiment, K=16).

Referring to a given loudness code value (or magnitude) stored in memory 80 as $L_n$ (at time n) then the subsequent code value $L_{n+1}$ (at time n+1) can be defined as follows:

| | |
|---|---|
| $L_{n+1} = \dfrac{L_n + \text{signal } 83}{2}$ | if $L_n >$ signal 83 |
| $L_{n+1} = L_n$ | if $L_n =$ signal 83 |
| $L_{n+1} = L_n$ | if $L_n \leq$ signal 83, and signal 93 = 0 |
| $L_{n+1} = n-1$ | if $L_n <$ signal 83, and signal 93 = 1 |

Note that signal 83 equals twice the absolute magnitude of the PCM word received on bus 23, plus one; or stated in mathematical terms: signal $83 = (2 \times |PCM|) + 1$.

Because of the logarithmic nature of the mu-law or A-law PCM coding scheme, the decrementing of the stored code, by one every K frames, is approximately equivalent to discharging a capacitor which was previously charged to a voltage equivalent to the linearized analogue speech signal. In such a case, the effective time constant, T, is given by:

T=2.89 K (in milliseconds), for mu-law.

Figure 4:
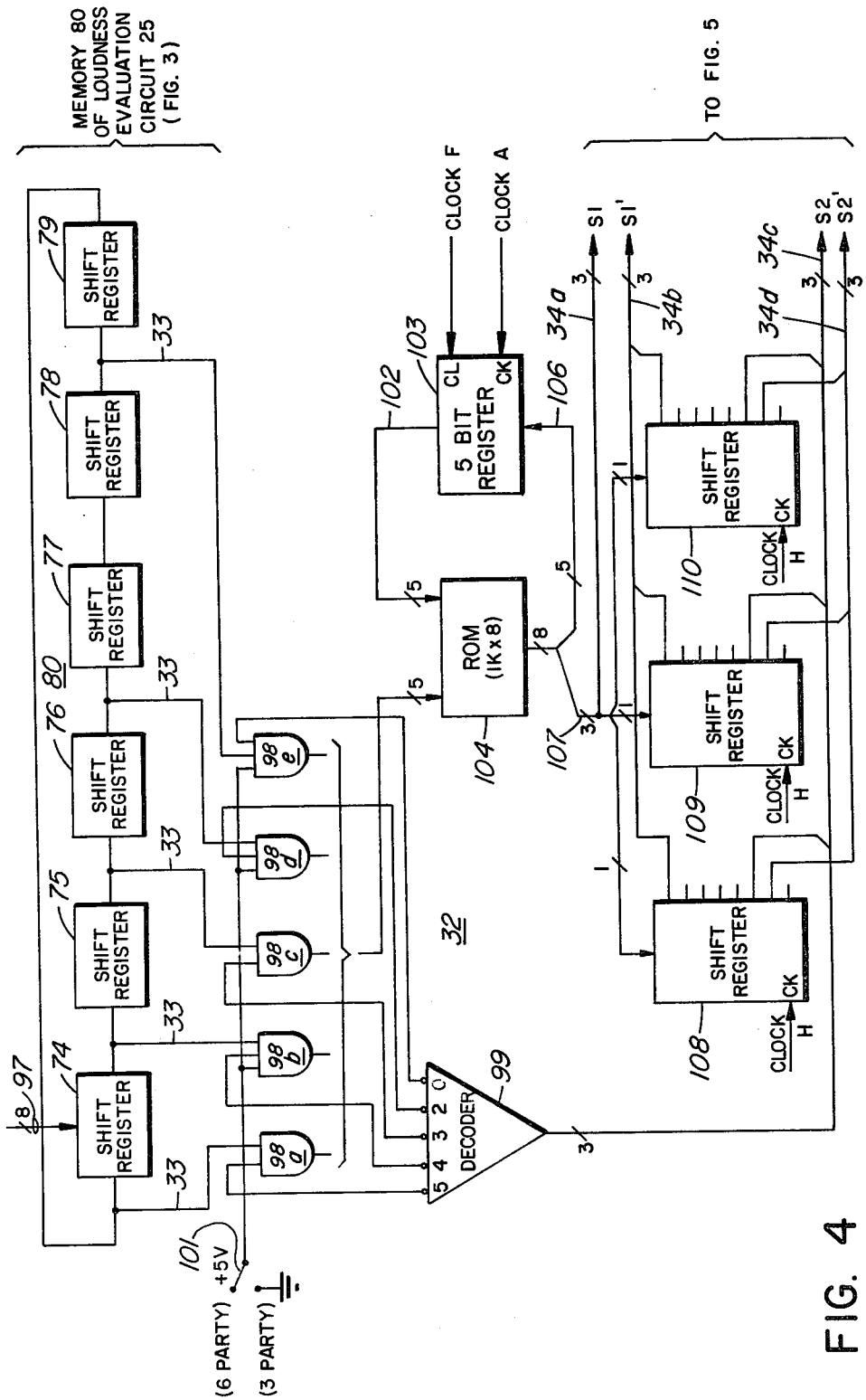
FIG. 4 is a simplified block diagram of the speaker identification circuit of FIG. 1.

FIG. 4 depicts the circuitry, in simplified block form, of speaker identification circuit 32. Memory 80, of FIG. 3, is repeated at the top of FIG. 4 for the sake of convenience. The five bits comprising data signal 82 are derived from memory 80 as shown, and are applied to AND gates 98a, 98b, 98c, 98d and 98e, referred to collectively as AND gates 98. The output of decoder 99 (T.I. SN74LS138) is also applied to AND gates 98 as depicted. Switch 101 functions to change circuit 32 between two three party conferences (switch 101 connected to logic 0, or ground potential) and a six party conference (switch 101 connected to logic 1, or +5 volts).

The five outputs from AND gates 98, along with five outputs on bus 102, from register 103, provide a ten-bit address for ROM (read only memory) 104. ROM 104 is comprised of two model 6353 devices by Monolithic Memories Inc. (MMI).

The purpose of speaker identification circuit 32 is to identify the two loudest of the five potential speakers for each channel timeslot, by analyzing the contents of memory 80. Circuit 32 operates in every channel timeslot and does not identify the absolute identities of the chosen speakers but only the relative identities of the two speakers relevant for each particular port (the relative addresses of the two chosen speakers will be referred to as S1 and S2). Note, that as depicted in FIG. 4, shift register 77 contains the loudness code for the conferee who is the "listener" at this particular instant (and this loudness code is not examined). The other five shift registers 74, 75, 76, 78, and 79 have their contents (i.e. loudness codes) examined by speaker identification circuit 32 to determine which two loudness codes are the largest, and consequently this can identify the relative addresses (S1 and S2) of the two conferees (corresponding to the two largest loudness codes) which should be "heard" (received) by the "listener".

The organization of memory 80 as a tapped 48-bit shift register provides a convenient means for offering the appropriate five equal-significant bits to circuit 32, carrying successively lower equal-significant bits from the five loudness codes.

Circuit 32 identifies the largest of five 8-bit codes (stored in memory 80) by sequentially comparing equal position bits as follows. Five bit register 103 (T1 model SN74LS174) is initially cleared to all logic zeroes. In the first step, the most significant bit of each of the five loudness codes, (note: shift registers 74, 75, 76, 78, and 79 each store one loudness code) via bus 33, is analyzed by ROM 104 and the five bits of register 103 (referred to as Y-bits) are updated as follows: if all the most significant bits from each loudness code are 0 (or 1), each Y-bit remains a logic 0; otherwise $Y_i = L_i$ (MSB), wherein $Y_i$ is the $i^{th}$ bit of register 103 (corresponding to the $i^{th}$ loudness code), and wherein $L_i$(MSB) is the most significant bit of the $i^{th}$ loudness code.

In other words, if the most significant bits (MSB) of the loudness codes are either all 0 or all 1, no selection can be made at this point, and all Y-bits remain "alive" as possible candidates (i.e. Y=logic 0). If only some MSB of the loudness codes are 1, all Y-bits associated with the O-bits from the loudness codes "die" (i.e. Y=-logic 1). All those Y-bits associated with the 1-bits from the loudness codes survive (i.e. Y=logic 0).

At the next step, the second most significant bits of the five loudness codes are considered. Y-bits that are dead (i.e. Y=logic 1) remain dead; those Y-bits which have survived (i.e. Y=logic 0) continue to survive if all associated bits from the loudness codes are either all 1 or all 0 (i.e. no selection possible). Some Y-bits may die (i.e. Y=logic 1) if their associated bit from the loudness codes is 0 while there are other bits from the loudness codes with 1 (i.e. only loudness codes associated with surviving Y-bits are considered).

In this way, after eight steps, there will be at least one surviving Y-bit, corresponding to the largest loudness code.

This selection process is conveniently implemented by ROM 104 which has a capacity of 1,024 words of 8-bits each. ROM 104 provides, as an output, 5-bits on bus 106 to register 103 and 3-bits on bus 107 to provide a 3-bit binary code S1 for the selected speaker, as well as providing the input to shift registers 108, 109 and 110, as shown. Registers 108, 109, and 110 are each a TI model SN74LS164.

If more than one Y-bit (in register 103) survives the selection process, more than one loudness code must have had the same instantaneous magnitude, down to the last bit. ROM 104 is designed to make a consistent choice considering rotational identities of the conferees and considering the implementation of a conference splitter (i.e. into two, three-party conferences).

As noted earlier, the output of ROM 104 on bus 107 is signal S1. Signal S1 is applied to shift reigsters 108, 109, and 110 as shown. Shift registers 108, 109 and 110 serve to delay signal S1 (on bus 34a) by one clock pulse (of clock H) to produce signal S1' (on bus 34b); by six clock pulses to produce signal S2 (on bus 34c); and by seven clock pulses to produce signal S2' (on bus 34d). The need for these different signals will become apparent with reference to FIG. 5, wherein they are employed. Note that buses 34a, 34b, 34c, and 34d are referred to collectively as bus 34.

Signal S2 is also applied to decoder 99 in FIG. 4. Decoder 99 functions to inhibit the one AND gate (by applying a logic 0 to the AND gate input), from AND gates 98, that (the previous cycle) carried the loudness code chosen as being the largest; note that the term previous cycle means the channel timeslot relating to the same "listener" in the immediately preceding TDM frame. In other words, decoder 99 functions to eliminate the immediately preceding largest loudness code from being chosen as the largest twice in a row. This forces ROM 104 and register 103 to choose the largest loudness code out of the remaining four loudness codes available (excluding the largest); i.e. this forces the choosing of the second largest loudness code. This technique of course, assumes that, for the two frame period under consideration, the largest loudness code in the first frame remains the largest code in the second frame; an assumption which is not unreasonable. Note also that, via switch 101, AND gates 98b, 98d, and 98e can be inhibited to produce two three-party conference circuits, rather than a six-party conference circuit, by preventing alternate speaker loudness codes from being selected, regardless of their magnitude.

Figure 5:
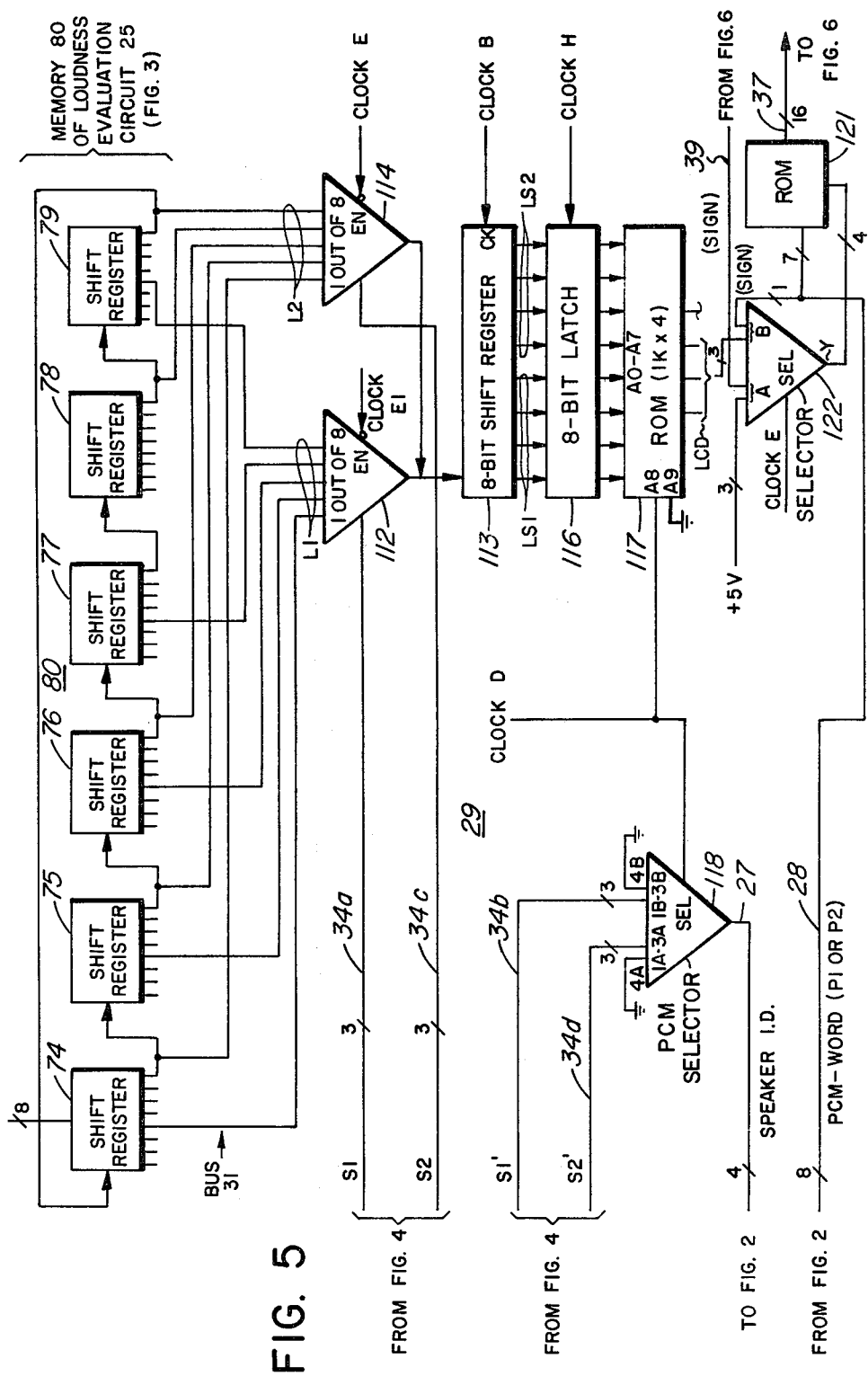
FIG. 5 is a simplified block diagram of the speaker selector circuit of FIG. 1.

FIG. 5 depicts the circuitry, in simplified form, of speaker selector circuit 29. Memory 80 is once again shown in the Figure for ease of reference. Signal S2 (on bus 34c) selects one of the five inputs applied to one-out-of-eight selector 114. The inputs to selector 114 consist of the last bit of shift registers 74, 75, 76, 78 and 79. The timing of signal S2 (and the enable input signal clock E) is such that the four most significant bits of the loudness code selected are taken, serially, from the last bit position of one of registers 74, 75, 76, 78 or 79. These four bits are applied serially, via selector 114, to shift register 113. These four most significant bits are referred to as LS2 and are stored, initially, in the four left most positions of register 113.

Subsequently, one out of eight selector 112 is used to select one out of five inputs from memory 80. The appropriate input for selector 112 is chosen by signal S1, on bus 34a (indicative of one of the two largest loudness codes). The inputs to selector 112 consist of the fourth bit of shift registers 74, 75, 76, 77 and 79. The timing of signal S1 (and the enable input signal clock E1 is such that the four most significant bits of the loudness code selected are taken serially from the fourth bit position of one of the registers 74, 75, 76, 77 or 79. These four bits are applied serially, via selector 112, to shift register 113. These four most significant bits are referred to as LS1 and are stored in the four left most positions of register 113. Note that while the four bits comprising LS1 were entering shift register 113, the four bits comprising LS2 were shifting to the right until finally, when all four bits of LS1 are entered, we have the status of register 113 as depicted in FIG. 5, with the four LS1 bits in the four left-most positions, and the four LS2 bits in the four right-most positions. LS1 and LS2 are then latched into eight-bit latch 116.

Eight-bit latch 116 is employed to provide an address code to ROM 117 (a 1 K×4 memory). Note that address terminals A0 to A7 of ROM 117 are fed from latch 116, address terminal A8 receives clock D, and address terminal A9 receives a constant logic 0 signal. The output of ROM 117 is a three bit code referred to as a loss control code, LCD. The significance of code LCD will be referred to later.

Figure 6:
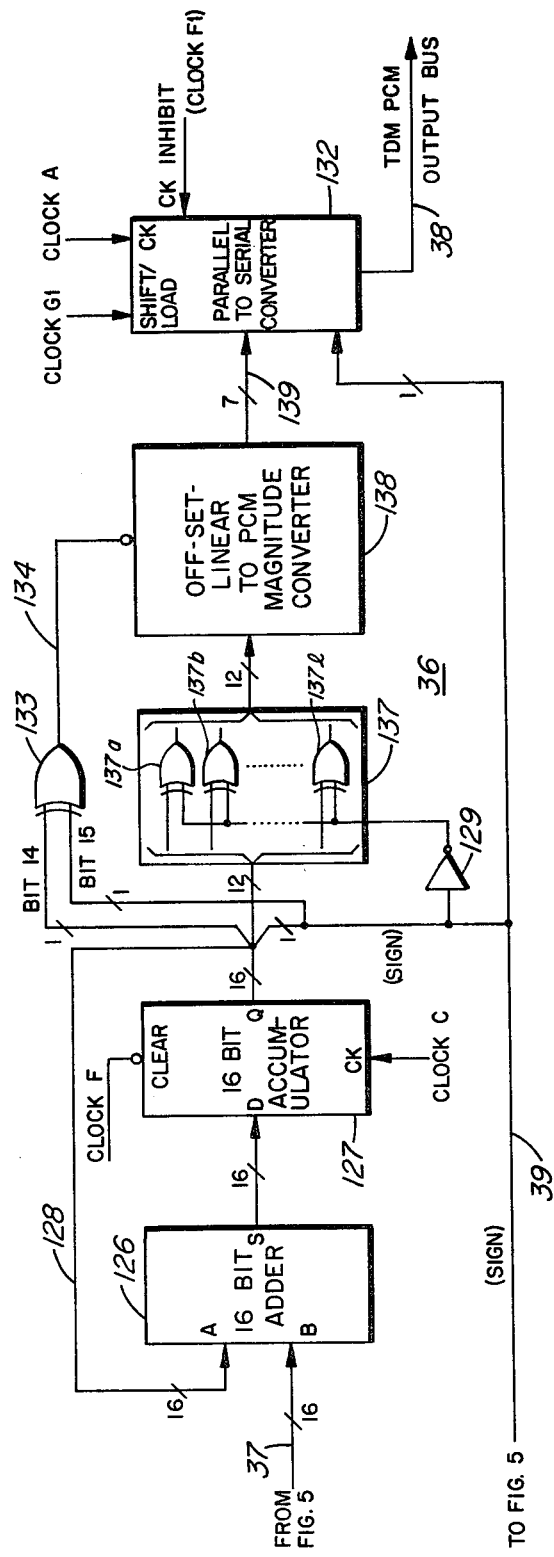
FIG. 6 is a simplified block diagram of the summing and compression circuit of FIG. 1.

Selector 118 selects either signal S1' or S2' to be applied on bus 27 to adder 58 in FIG. 2. This results in the appropriate received PCM word being fetched from RAM 41 (FIG. 2) and applied on bus 28 via latch 53 (FIG. 2). The seven magnitude bits thereof are received by linearization ROM 121 and the sign bit is received by selector 122. The A-input of selector 122 comprises four terminals, three of which receive a constant logic 1 signal, and the fourth of which receives the sign bit on line 39 from accumulator 127 (FIG. 6). The B-input of selector 122 comprises four terminals, three of which receive the three-bit code LCD from ROM 117 and the fourth of which receives the sign bit of the PCM sample on bus 28. Output terminal Y of selector 122 is, of course, either the data applied to its A input or its B input as determined by clock E. The output of selector 122 is applied to ROM 121; the four bits from selector 122 along with the seven bits from the PCM word on bus 28 serve to provide an eleven bit address for ROM 121. The output of ROM 121 on bus 37 is a 16 bit linearized PCM word, representative of the PCM sample on bus 28 but with an attenuation factor (which may be zero, included). Note that the attenuation factor is controlled by code LCD.

In more detail, returning to the operation of ROM 117, the actual function of ROM 117 is to monitor the difference in magnitudes between the PCM samples of the two loudest speakers based upon the loudness codes (recall that the signals applied to address inputs A0 to A7 of ROM 117 are the codes LS1 and LS2 representative of the four most significant bits from each of the loudness codes of the two largest loudness codes). In one specific case, i.e. where the loudest speaker is talking and the second loudest speaker is not, (i.e. only one speaker, in effect) the speech sample of the loudest speaker is not attenuated at all. In another specific case, i.e. where the loudest speaker and the second loudest speaker have the same loudness code magnitudes, each speaker has 3 db of effective attenuation inserted into their respective speech samples. In the inbetween cases, i.e. where there are two speakers and there is a difference in magnitude between the loudest and second loudest speakers, as the difference in magnitude increases, the loudest speaker receives less and less attenuation (to a minimum limit of zero added attenuation) and the second loudest speaker receives more and more attenuation (to a maximum limit of 20 db effective added attenuation). In short, code LCD output from ROM 117 is an indication of how much (if any) attenuation should be applied to a particular PCM sample. With code LCD represented by three bits, eight different attenuation values are possible. In practice, seven of the eight possible values of code LCD are used to provide seven different attenuation values. The eighth possible LCD code (all logic 1's) is not used for attenuation control, but rather, is used to address certain constant values stored in ROM 121, to be explained more fully later.

As a further refinement, some additional loss (i.e. more than 0 db) is inserted when the magnitude of the loudness code of the loudest speaker is below a certain threshold value. Below this threshold the signal is deemed to be primarily noise. This refinement tends to reduce the noise heard on an idle conference.

FIG. 6 depicts the circuitry for adding the PCM words from the loudest and the second loudest speaker, and for compressing the resultant sum into a coded PCM signal. Sixteen bit adder 126 (e.g. four TI model SN74LS283) receives, on bus 37, the sixteen bits (in two's complement form) from ROM 121 (FIG. 5). Note that in 2's complement notation, negative values are represented in such a way that a simple adder will give the correct sum at positive and/or negative values, as long as the range given by the number of bits available is not exceeded. The output of adder 126, on terminals S, is applied to sixteen-bit accumulator 127 (e.g. two TI model SN74LS273) which had been initialized (i.e. cleared) to all logic 0's. The Q outputs of accumulator 127 are routed back to the A inputs of adder 126 via bus 128. The second time adder 126 add, it adds the data on its B inputs (from ROM 121, FIG. 5) to the data on its A inputs (from accumulator 127); this results in the total sum of the loudest and second loudest linearized PCM signals.

A third addition is performed to add, to the sum of the loudest and second loudest PCM words, an offset of either +64 or −65. If, after the first two additions, the sign bit stored in accumulator 127 is a logic 0 (indicating that the sum is greater than or equal to zero) then +64 is added. This occurs since the sign bit on line 39 is routed back to selector 122. At the appropriate time, determined by clock signal E applied to selector 122, the signals applied to the A input of selector 122 appear on the Y output of selector 122 and address ROM 121 which in turn outputs the constant number +64 (in binary format) on bus 37. The number +64 is then applied to input B of adder 126 and consequently added to the sum of the loudest and second loudest signals already stored in accumulator 127; the result of this addition is of course stored in accumulator 127.

If the sign bit on line 39 is a logic 1, after the addition of only the loudest and second loudest signals (indicating that the sum is less than zero), then the constant −65 (in 2's complement format) is added (instead of +64). This is done in an analogous manner to the previous example of adding +64. This offset (i.e. +64 or −65) is required to perform the conversion to coded (or non-linear) PCM, soon to be described.

Referring to the sixteen individual output bits of accumulator 127 as bits zero to fifteen (with zero the least significant, and fifteen the most significant), note that bit-15 is the sign bit and is applied to inverter 129, to EXCLUSIVE OR gate 133, to selector 122 (FIG. 5) via line 123, and to parallel-to-serial converter 132. Bit-14 is applied to EXCLUSIVE OR gate 133, the output of which, on line 134, provides an enable signal to magnitude converter 138 (described in more detail in FIG. 8).

Bits 0 and 1 from accumulator 127 are not used (except to increase the accuracy of intermediate results in adder 126). The remaining twelve bits from accumulator 127 (namely bit-2 to bit-13) are applied to gate 137, comprised of twelve EXCLUSIVE OR gates 137a to 137l, inclusive; gate 137a receives on one of its inputs, bit-13 from accumulator 127, its other input is the signal from inverter 129. Similarly with the other gates 137, with gate 137l receiving on one of its inputs, bit-2 from accumulator 127; its other input is the signal from inverter 129. The result of gate 137 is to invert the bits applied to gate 137 when the output of inverter 129 is a logic 1 (i.e. the sign bit is a logic 0 indicating positive) and to not invert the bits applied to gate 137 when the output of inverter 129 is a logic 0 (i.e. the sign bit is a logic 1, indicating negative).

When the sign bit is a logic 1 (i.e. the output of inverter 129 is logic 0) the signals applied to gate 137, from accumulator 127 are passed with no change. When the sign bit is a logic 0 (i.e. the output of inverter 129 is a logic 1) the signals applied to gate 137, from accumulator 127, are inverted. The output signals from gate 137 thus represent the inverted magnitude of the accumulated linear offset code on bus 128; they are applied to off-set linear to PCM magnitude converter 138, the output of which is a seven-bit compressed (or coded) binary signal representative of the magnitude of the twelve bits input into converter 138 (described in more detail in FIG. 8). The seven bits from converter 138 are applied to parallel-to-serial converter 132 via bus 139; so also, is the sign bit on line 39. The combination of the seven bits from converter 138 and the sign bit from line 39 form a coded PCM word in converter 132; this coded PCM word is shifted out of converter 132, in serial fashion, onto output bus 38, during the next TDM timeslot of the conference. In other words, the coded PCM word to appear on bus 38 is derived from the PCM words stored in RAM 41 (FIG. 2) plus the loudness codes stored in memory 80 (FIG. 3) during one TDM timeslot of the conference, for transmission in the subsequent timeslot of the conference.

FIG. 7a depicts, in a simplified fashion, the signals involved in a six-party conference wherein the conferees are referred to as A, B, C, D, E, and F. Three consecutive TDM frames are shown, referenced as frames 1, 2, and 3. The PCM word originating with conferee A, and received on bus 21 during frame 1 is indicated as A1; similarly the PCM word originating with conferee B, and received on bus 21 during frame 1 is indicated as B1, etc.

Assuming that conferee A is indicated as being the "loudest speaker", conferee B is indicated as being the second "loudest speaker", and conferee C is indicated as being the third "loudest speaker" we can see the resultant signals produced on bus 38 being as follows (and as depicted in FIG. 7a). Commencing with frame 2, during the timeslot on bus 38 corresponding to conferee A, there is transmitted a signal derived both from the signal received from conferee B in frame 1 (indicated as B1) and from the signal received from conferee C in frame 1 (indicated as C1). During the timeslot on bus 38 corresponding to conferee B, there is transmitted a signal derived both from the signal received from conferee A in frame 1 (indicated as A1) and from the signal received from conferee C in frame 1 (indicated as C1). Similarly, during the timeslot on bus 38 corresponding to conferee C, there is transmitted a signal derived both from the signal received from conferee A in frame 2 (indicated as A2) and from the signal received from conferee B in frame 1 (indicated as B1), etc. for conferees D, E and F.

FIG. 7b depicts the operation of the conference circuit of FIG. 1 when it is engaged in two three-party conferences (i.e. when switch 101 of FIG. 4 is connected to ground). The two conferences are referred to as conference number 1 and conference number 2 in FIG. 7b, with conferees A, C, and E participating in conference number 1 and conferees B, D, and F participating in conference number 2. It can be seen that the delay, between receiving a PCM word and employing that PCM word, is never more than one frame delay.

Figure 8:
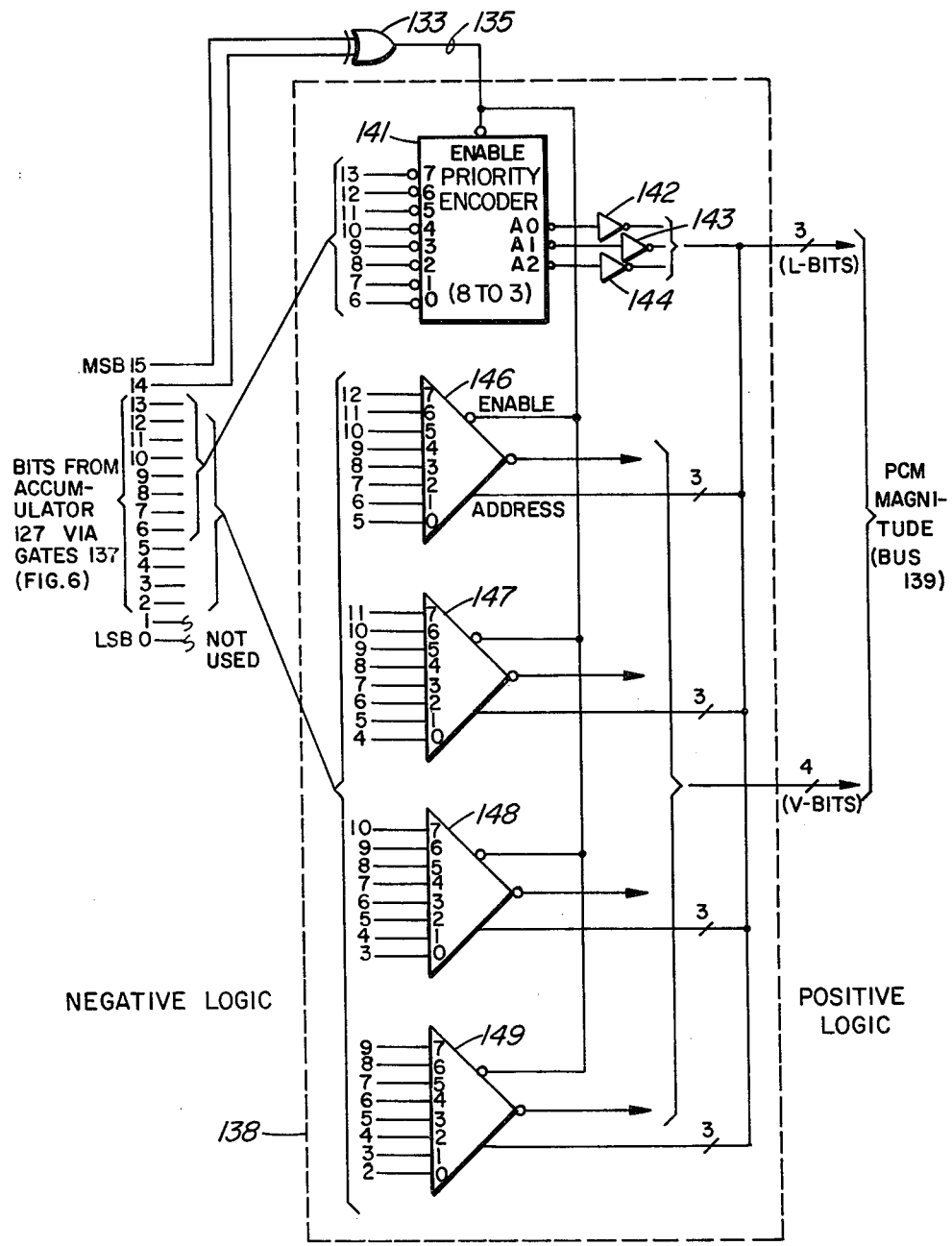
FIG. 8 is a simplified block diagram of the offset linear to PCM magnitude converter of FIG. 6.

FIG. 8 depicts, in more detail, the circuitry of off-set linear to PCM magnitude converter 138. The inputs to converter 138 are shown pictorially as bits 0 to 15, with bits 0 and 1 not used and bits 14 and 15 applied to EXCLUSIVE OR gate 133 to control the enable inputs of the constituent devices of converter 138. If enable signal 135 is set (i.e. is a logic 1 when bit 4≠bit 15), it indicates overflow, and causes the maximum magnitude to be indicated (i.e. all logic 1) by the seven bits output by converter 138.

Converter 138 comprises priority encoder 141 (e.g. TI model SN74148), inverters 142, 143, and 144, along with one-out-of-eight selectors 146, 147, 148 and 149 (e.g. TI model SN74LS151). The three outputs of priority encoder 141 are inverted by inverters 142, 143, and 144 as shown. The three outputs of inverters 142, 143 and 144 are the L-bits of the PCM code word. These three L-bits are also used to address the one-out-of-eight selectors 146, 147, 148, and 149 as shown. The outputs of selectors 146, 147, 148 and 149 form the four V-bits of the PCM code word.

Figure 9:
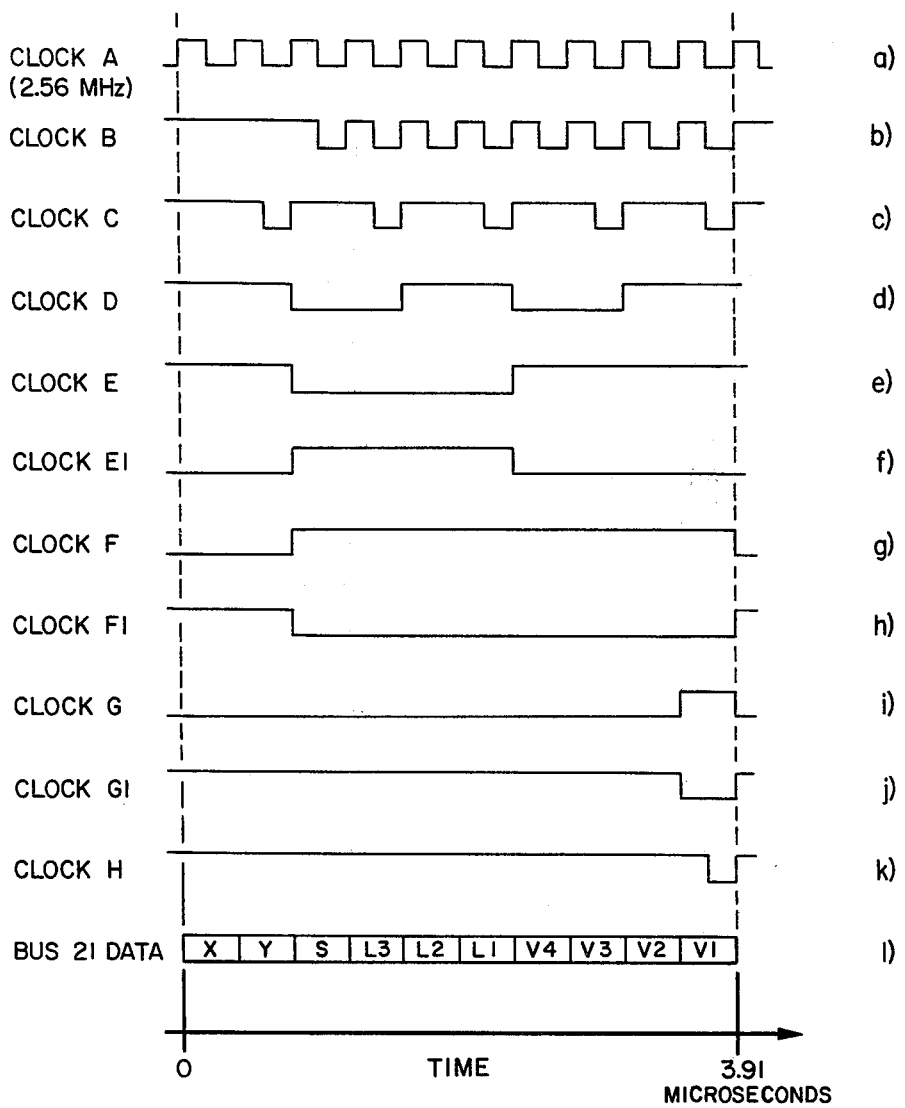
FIG. 9, comprises parts, a, b, c, d, e, f, g, h, i, j, k, and l, is a timing diagram useful for understanding the operation of the circuits depicted in the previous figures.

FIG. 9, comprising parts a to l, inclusive, is a timing diagram useful for understanding the operation of the circuits depicted in the previous figures. The frequency of clock A (FIG. 9a) is 2.56 MHz and note that one timeslot lasts for ten cycles of clock A. FIG. 9l depicts the digital data that appears on bus 21 (FIG. 1). The PCM word comprises the bits indicated as S, L3, L2, L1, V4, V3, V2, and V1, with bit S being the sign bit. The bits indicated as X and Y are control bits peculiar to the particular switching machine for which the present conference circuit was designed, and are not germane to this discussion. Note that all the clocks of FIG. 9 (except clock A) are per channel clocks; i.e. they occur only during a time slot at the conference circuit. The remainder of FIG. 9 is believed to be self explanatory and consequently will not be discussed further.

Figure 10:
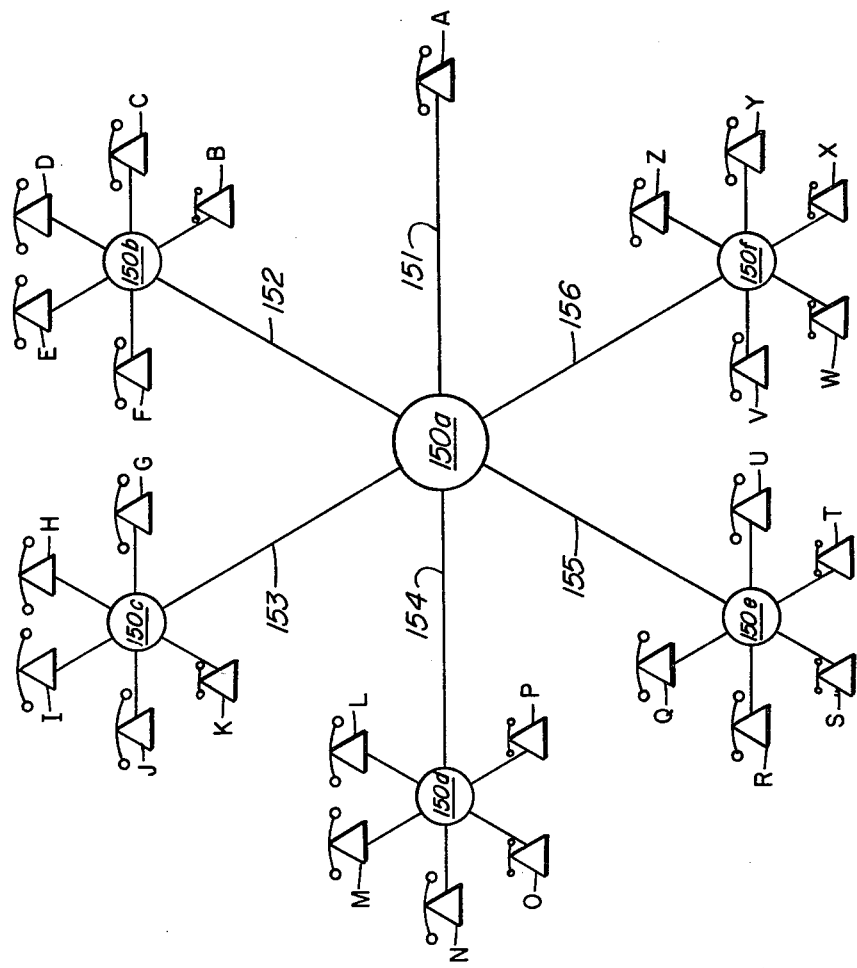
FIG. 10 is a simplified stylized representation of the conference circuit of the present invention providing a twenty-six party conference connection, using tandeming.

FIG. 10 depicts, in a stylized fashion, a conference interconnection between twenty-six conferees, indicated as A to Z, inclusive, employing six conference circuits 150a to 150f, referred to collectively as conference circuits 150. Each conference circuit 150 is a six-party conference circuit constructed according to the teachings of the present invention, and consequently each circuit 150 has six ports (as depicted).

The conference circuits 150 can be in the same switching office (e.g. DMS 100; trademark of Northern Telecom Limited) or they could each be in a different switching office. In short, the links 152 to 156 could be trunks between different switching offices. Link 151 is of course a subscriber loop between conferee A and the switching office housing conference circuit 150a.

It should be noted that it is preferable to employ, with the conference connection of FIG. 10, certain operating procedures such as taking turns talking. However, because both the "loudest" and the "second loudest" conferee are heard by all parties to the conference, it is a relatively simple task to interrupt the current primary (i.e. loudest) conferee.

What is claimed is:

1. A conference circuit for connection in a digital telephone system between a first TDM (time division multiplex) bus for carrying, in N distinct time slots of each frame, PCM (pulse code modulation) words to said conference circuit, and a second TDM bus for carrying, in N distinct time slots of each frame, PCM words from said conference circuit, for establishing a conference connection between N-conferees, wherein N is a positive integer, $3 \leq N$, said conference circuit comprising:

memory means for storing the N PCM words received on said first TDM bus during said N time slots;

means for determing for each conferee, according to a predetermined criterion, which two PCM words stored in said memory means, excluding the PCM word originating from said conferee, meet said criterion; and means for summing said two PCM words meeting said criterion and for applying the resultant PCM sum word to said second TDM bus.

2. The conference circuit of claim 1 wherein said predetermined criterion is the magnitude of said PCM words.

3. The conference circuit of claim 1 wherein said predetermined criterion is the absolute value of said PCM words, in each of said N time slots, during the most recent frames.

4. The conference circuit of claim 1, 2 or 3 wherein N equals six.

5. A conference circuit for connection in a digital telephone system between a first TDM (time division multiplex) bus for carrying, in N distinct time slots of each frame, PCM (pulse code modulation) words to said conference circuit, and a second TDM bus for carrying, in N distinct time slots of each frame, PCM words from said conference circuit, for establishing a conference connection between N-conferees, wherein N is a positive integer, $3 \leq N$, said conference circuit comprising:

memory means, responsive to said PCM words on said first TDM bus, for storing the N PCM words received on said first TDM bus during said N time slots;

code means for forming and for storing N loudness codes, each said loudness code being associated with one conferee and being derived from the absolute magnitude of the PCM words in that conferee's time slot on said first TDM bus;

selection means both for determining the two PCM words to be read from said memory means, for each said conferee, by determining according to a predetermined criterion, which two of said N loudness codes meet said criterion, and for reading from said memory means, for each said conferee, the two most recent PCM words corresponding to the two conferees associated with the two loudness codes indicated as meeting said criterion; and summation means for adding together said two PCM words, so read by said selection means, and producing a resultant PCM word on said second TDM bus during the time slot corresponding to said conferee.

6. The conference circuit of claim 5 wherein said predetermined criterion is the magnitude of said loudness codes, excluding the loudness code associated with said conferee.

7. The conference circuit of claim 5 or 6 wherein N equals six.

8. The conference circuit of claim 5 or 6 wherein said PCM words are non-linearly encoded PCM words and said summation means comprises:

means for linearizing said non-linearly encoded PCM words to produce linearly encoded PCM words;

means for adding said linearly encoded PCM words to produce a resultant linear PCM sum; and means for coding said resultant linear PCM sum to produce a resultant coded PCM sum.

9. A conference circuit for connection in a digital telephone system between a first TDM (time division multiplex) bus for carrying, in N distinct timeslots of each frame, PCM (pulse code modulation) words to said conference circuit, and a second TDM bus for carrying, in N distinct time slots of each frame, PCM words from said conference circuit, for establishing a conference connection between N-conferees wherein N is a positive integer, $3 \leq N$, said conference circuit comprising:
  addressable memory means, responsive to said PCM words on said first TDM bus, for storing the N PCM words received on said first TDM bus during said N time slots, in a sequential and cyclic fashion;
  code means for forming and for storing N loudness codes, each said loudness code being associated with one conferee and being derived from the absolute magnitude of the PCM words in that conferee's time slot on said first TDM bus;
  selection means both for determining the two PCM words to be read from said memory means, for each said conferee, by determining according to a predetermined criterion, which two of said N loudness codes, excluding the loudness code associated with said conferee, meet said criterion, and for reading from said memory means, for each said conferee, the two most recently stored PCM words from memory locations corresponding to the two conferees associated with the two loudness codes indicated as meeting said criterion; and
  summation means both for attenuating said two PCM words, so read by said selection means, by inserting a predetermined loss into each said PCM word based upon the magnitudes of said loudness codes associated with the conferees from which the PCM words were selected and for summing said two attenuated PCM words and producing a resultant PCM word on said second TDM bus during the time slot corresponding to said conferee.

10. The conference circuit of claim 9 wherein said predetermined loss, for each pair of PCM words to be summed, is less for the PCM word having the larger associated loudness code.

11. The conference circuit of claim 9 or 10 wherein said predetermined loss is zero.

12. The conference circuit of claim 9 or 10 wherein said predetermined criterion is the magnitude of said loudness codes.

13. The conference circuit of claim 9 wherein said predetermined loss may be zero, and wherein said predetermined criterion is the largest of said loudness codes.

14. The conference circuit of claim 9, 10 or 13 wherein N equals six.

15. A conference circuit interconnection for a twenty-six party conference wherein six conference circuits, each constructed according to claim 1, 5 or 13, wherein N=6, are employed; five of said conference circuits interact with signals from five conferees each, and the remaining five ports, one from each of said first five conference circuits, connect to give ports of said sixth conference circuit, and the remaining sixth port of said sixth conference circuit interacts with signals from one conferee.

16. A conference circuit for connection in a digital telephone system between a first TDM (time division multiplex) bus for carrying, in N distinct time slots of each frame, PCM (pulse code modulation) words to said conference circuit, and a second TDM bus for carrying, in N distinct time slots of each frame, PCM words from said conference circuit, for establishing an N-party conference connection between a first conferee and (N−1) other conferees, wherein N is a positive integer, $3 \leq N$, said conference circuit comprising:
  memory means, responsive to said PCM words on said first TDM bus, for storing the N most recent PCM words received on said first TDM bus during said N time slots;
  code means for forming and for storing N loudness codes, each said loudness code being associated with one conferee and being derived from the absolute magnitude of the PCM words in that conferee's time slot on said first TDM bus;
  selection means both for determining according to a predetermined criterion, for said first conferee, two PCM words to be read from said memory means, and for reading from said memory means, for said first conferee, said two PCM words; and
  summation means for adding together said two PCM words, so read by selection means, and producing a resultant PCM word on said second TDM bus during the time slot corresponding to said first conferee.

17. The conference circuit of claim 16 wherein said predetermined criterion for determining said two PCM words is to select the two loudness codes meeting a predetermined requirement, excluding the loudness code of said first conferee, and to choose as the two PCM words, from the N PCM words stored in said memory means, the two PCM words associated with the two selected loudness codes.

18. The conference circuit of claim 16 or 17 wherein N equals either three or six.

19. The conference circuit of claim 17 wherein said requirement is: the loudness codes having the largest magnitude and the second largest magnitude.

20. The conference circuit of claim 19 wherein N equals either three or six.

21. A conference circuit for connection in a digital telephone system between a first TDM (time division multiplex) bus for carrying, in N distinct time slots of each frame, PCM (pulse code modulation) words to said conference circuit, and a second TDM bus for carrying, in N distinct time slots of each frame, PCM words from said conference circuit, for establishing conference connections between each M conferees, wherein N and M are each positive integers, $N \geq 6$, $M \geq 3$, M is a factor of N, and $M < N$, said conference circuit comprising:
  memory means, responsive to said PCM words on said first TDM bus, for storing the N most recent PCM words received on said first TDM bus during said N time slots;
  code means for forming and for storing N loudness codes, each said loudness code being associated with one conferee and being derived from the absolute magnitude of the PCM words in that conferee's time slot on said first TDM bus;
  selection means both for determining according to a predetermined criterion, for each said conferee of each said conference connection, two PCM words to be read from said memory means, and for reading from said memory means, for each said conferee, said two PCM words; and
  summation means for adding together said two PCM words, so read by said selection means, and producing a resultant PCM sum word on said second TDM bus during the time slot corresponding to said conferee.

22. The conference circuit of claim 21 wherein N equals six and M equals three.

23. The conference circuit of claim 21 wherein N equals twenty-four and M equals either three, four, or six.

24. The conference circuit of claim 21 wherein N equals thirty and M equals either three, five, or six.

25. The conference circuit of claim 21, 22, 23, or 24 wherein said predetermined criterion for determining said two PCM words is to select, for each said conferee of each said conference connection, the two loudness codes meeting a predetermined requirement excluding the loudness code of said conferee, and to choose as the two PCM words, from the N PCM words stored in said memory means, the two PCM words associated with the two selected loudness codes.

26. A method of providing a conference circuit interconnection in a digital telephone system for N conferees, wherein N is a positive integer, $3 \leq N \leq 32$, and wherein said telephone system has a first TDM (time division multiplex) bus for carrying, in N distinct time slots of each frame, PCM (pulse code modulation) words to said conference circuit, and a second TDM bus for carrying, in N distinct time slots of each frame, PCM words from said conference circuit, said method comprising:
storing the N PCM words received on said first TDM bus during said N time slots;
determining for each said conferee, according to a predetermined criterion, which two of said N most recently stored PCM words, excluding the PCM word originating from said conferee, meet said criterion;
summing, for each said conferee, said two PCM words that meet said criterion and outputting the resultant PCM sum on said second TDM bus.

27. The method of claim 26 wherein said predetermined criterion is the absolute magnitude of said PCM words, in each of said N time slots.

28. The method of claim 26 further including the step of forming and storing N loudness codes, one for each said conferee, based upon the absolute magnitude of the PCM words received in each conferee's respective timeslot, such that the magnitude of each said loudness code increases with an increase in the absolute magnitude of the PCM words from said respective conferee and decreases with a decrease in the absolute magnitude of the PCM words from said respective conferee; and said predetermined criterion is based upon selecting for each said conferee, from the N stored PCM words, two PCM words corresponding to the two loudness codes with the greatest magnitudes, excluding the loudness code associated with said conferee.

29. The method of claim 28 further including the step of inserting predetermined losses (which may be zero) into the two PCM words that meet said criterion, prior to summing said PCM words; said predetermined losses depending upon the relative magnitude of the loudness codes associated therewith.

30. The method of claim 28 further including the step of inserting predetermined losses (which may be zero) into the two PCM words that meet said criterion, prior to summing said PCM words; said predetermined losses depending upon the absolute magnitude of the loudness codes associated therewith.

31. A method of providing a conference circuit interconnection in a digital telephone system for N conferees, wherein N is a positive integer, $3 \leq N \leq 32$, and wherein said telephone system has a first TDM (time division multiplex) bus for carrying, in N distinct time slots of each frame, PCM (pulse code modulation) words to said conference circuit, and a second TDM bus for carrying, in N distinct time slots of each frame, PCM words from said conference circuit, said method comprising:
storing, in a sequential and cyclic fashion in a memory means, the N PCM words received on said first TDM bus during said N time slots;
forming and storing, in a sequential and cyclic fashion, N loudness codes, one for each said conferee, based upon the absolute magnitude of the PCM words received in each conferee's respective timeslot, such that the magnitude of each said loudness code increases with an increase in the absolute magnitude of the PCM words from said respective conferee, and decreases with a decrease in the absolute magnitude of the PCM words from said respective conferee;
determining, for each said conferee, which two of said N most recently stored PCM words in said memory means are to be read by choosing the two PCM words corresponding to the two loudness codes, excluding the loudness code for that said conferee, that have the largest magnitudes;
inserting predetermined attenuations (which may be zero) into the two PCM words read from said memory means;
summing, for each said conferee, said two PCM words, so attenuated, and outputting the resultant PCM sum on said second TDM bus.

32. The method of claim 26, 28, 30 or 31 wherein N equals six.

* * * * *